(12) United States Patent
Hamdi et al.

(10) Patent No.: US 10,374,946 B2
(45) Date of Patent: Aug. 6, 2019

(54) CENTRALIZED WIRELESS NETWORK MANAGEMENT SYSTEM

(71) Applicant: Dell Products L.P., Round Rock, TX (US)

(72) Inventors: Rabah S. Hamdi, Spring, TX (US); Christopher Stephen Petrick, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 988 days.

(21) Appl. No.: 14/658,469

(22) Filed: Mar. 16, 2015

(65) Prior Publication Data
US 2016/0277971 A1    Sep. 22, 2016

(51) Int. Cl.
*H04L 12/725*    (2013.01)
*H04L 12/721*    (2013.01)
*H04L 29/08*    (2006.01)

(52) U.S. Cl.
CPC ............ *H04L 45/306* (2013.01); *H04L 45/38* (2013.01); *H04L 67/327* (2013.01); *H04L 45/66* (2013.01)

(58) Field of Classification Search
CPC ................................ H04W 92/12; H04L 45/38
See application file for complete search history.

(56) References Cited

U.S. PATENT DOCUMENTS

| | | | | |
|---|---|---|---|---|
| 9,179,007 | B1* | 11/2015 | Yadav | H04M 15/66 |
| 2011/0110266 | A1* | 5/2011 | Li | H04L 47/2491 |
| | | | | 370/253 |
| 2012/0099562 | A1* | 4/2012 | Smadi | H04W 36/08 |
| | | | | 370/332 |
| 2014/0010083 | A1* | 1/2014 | Hamdi | H04L 47/193 |
| | | | | 370/235 |
| 2014/0052836 | A1* | 2/2014 | Nguyen | H04L 45/306 |
| | | | | 709/223 |
| 2014/0133492 | A1* | 5/2014 | Takajo | H04L 45/22 |
| | | | | 370/401 |
| 2014/0334471 | A1* | 11/2014 | Chen | H04W 16/06 |
| | | | | 370/338 |

* cited by examiner

*Primary Examiner* — Siming Liu
(74) *Attorney, Agent, or Firm* — Haynes and Boone, LLP (57) ABSTRACT

A centralized network management system includes a wireless controller system and a plurality of access points that are coupled together through a network. Each of the plurality of access points is configured to receive wireless traffic from user devices and determine whether flow session rules are available for the wireless traffic. If so, wireless traffic received by an access point that is part of a flow session is modified by that access point according to at least one flow session rule that was received from the wireless controller system and that is associated with the flow session to which that wireless traffic belongs. That modified wireless traffic is translated to modified wired traffic by the access point, and the access point then perform an action on the modified wired traffic according to the at least one flow session rule associated with the flow session.

20 Claims, 5 Drawing Sheets

CENTRALIZED WIRELESS NETWORK MANAGEMENT SYSTEM

BACKGROUND

The present disclosure relates generally to information handling systems, and more particularly to a centralized wireless network management system for managing and providing wireless network access to information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

IHS's, and particularly mobile user devices, typically utilize wireless networks to communicate, use applications, and/or perform other user device actions known in the art, which has resulted the widespread deployment of wireless network systems that include evermore complex wireless infrastructure, wireless network management requirements, user account management, and billing. Conventional wireless network management systems are closed systems that typically require user device configurations to be duplicated across all wireless controllers and access points to which a user device may connect. As such, conventional wireless management systems may not scale across different physical locations or networks, require wireless controllers with complex and costly designs to support any level of centralized network management, and suffer from latency and faulty configuration issues that result from the high configuration churn required for user device mobility.

Accordingly, it would be desirable to provide an improved centralized wireless network management system.

SUMMARY

According to one embodiment, an information handling system (IHS) includes a processing system; a memory system that stores at least one first flow session rule that is associated with a first flow session, and that includes instructions that, when executed by the processing system, cause the processing system to provide an access point that is configured to: receive first wireless traffic from a first user device; determine that at least one first flow session rule is available for the first wireless traffic that is part of the first flow session; modify the first wireless traffic according to the at least one first flow session rule to provide modified first wireless traffic; translate the modified first wireless traffic to modified first wired traffic; and perform an action on the modified first wired traffic according to the at least one first flow session rule.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
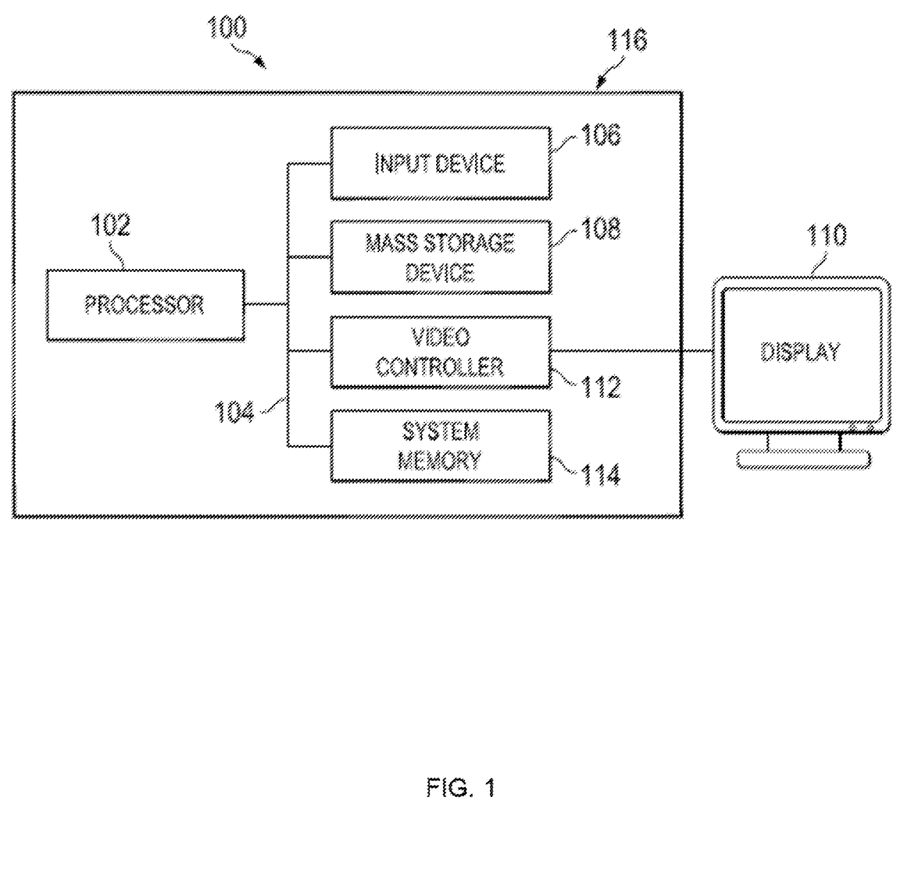
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
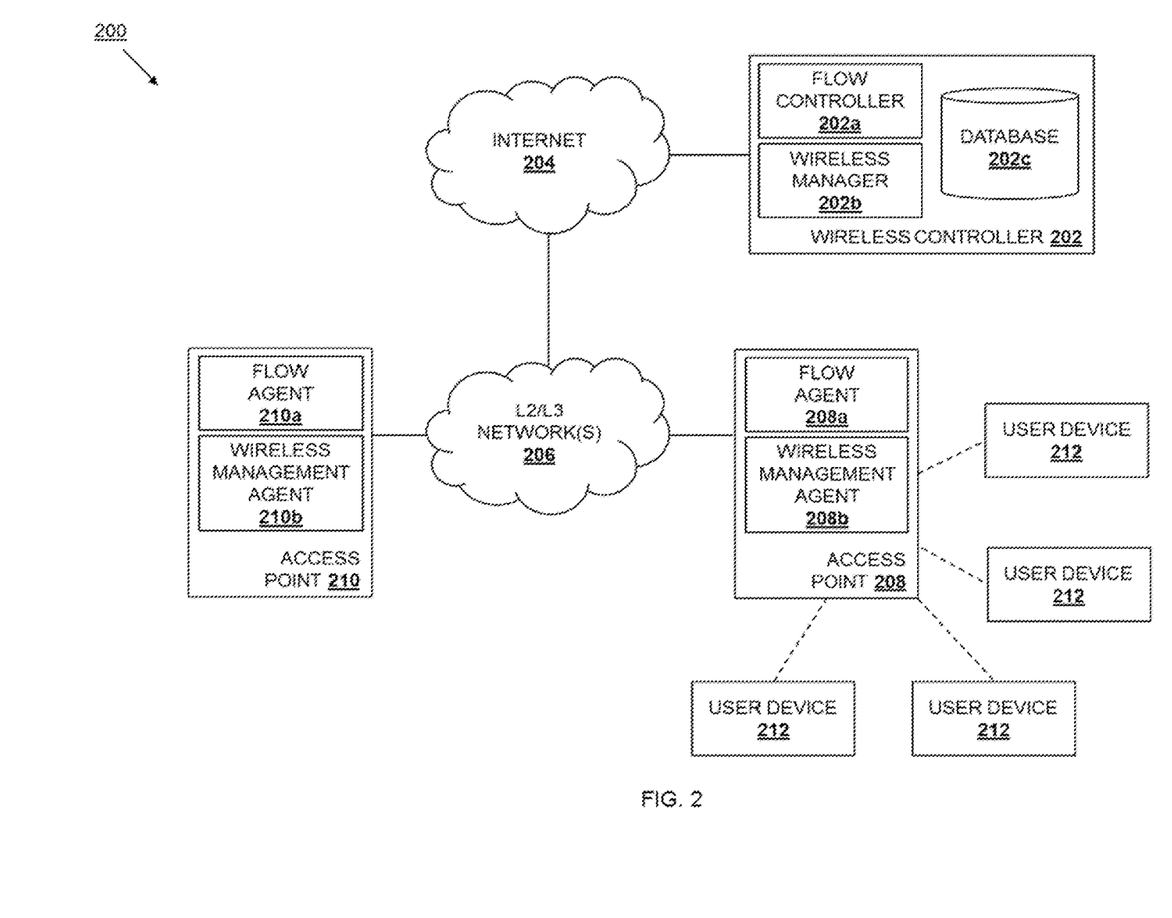
FIG. 2 is a schematic view illustrating an embodiment of a centralized wireless network management system.

Referring now to FIG. 2, an embodiment of a centralized wireless network management system 200 is illustrated. As discussed in detail below, the centralized wireless network management system 200 provides for flow-based wireless access control using a flow-based "cloud" wireless controller system and wireless access point flow agents. Such flow-based wireless access control provides for comprehensive views, control, management, and serviceability of wireless systems and clients, effectively enabling wireless access control and management at the entry point of a wireless access layer across different locations, and allowing for "thin" (relatively non-complex) access point designs (while also providing substantial benefits for "fat" (relatively complex) access point designs as well). Furthermore, the scalable could-managed wireless flow-based architecture utilizes flexible, higher-performance flow-based wireless communication systems to address new content and application aware technologies, and accelerates applications and services requiring deeper packet inspection and classification over a longer product life cycle without inheriting network management complexity.

The centralized network management system 200 includes a wireless controller system that, in the illustrated embodiment, includes a wireless controller 202 having a flow controller 202a and a wireless manager 202 that are each connected to a database 202c. However, while illustrated as a single device, the wireless controller 202 may include any number of devices connected directly or through networks while remaining within the scope of the present disclosure. While illustrated with only the flow controller 202a, the wireless manager 202, and the database 202c, one of skill in the art will recognize that the wireless controller 202 may include a variety of other components such as, for example, communication systems, access, authentication, and accounting (AAA) systems, processing systems, memory systems including instructions that when executed by the processing systems cause the processing systems to provide the functionality discussed below for the flow controller 202a the wireless manager 202b (and in some embodiments, the flow agents in the access points described below) and/or other components of the wireless controller 202, and/or a variety of other wireless controller subsystems known in the art. In some embodiments, the wireless controller 202 provides a cloud-based wireless flow manager that is configured to couple to the wireless access control system provided by the access points discussed below using a predefined set of protocols and communication Application Programming Interface (API) exchanges, provide rule sets for application-based wireless flows and matching network segmentation/properties to the access points, define and manage mobility and roaming through the access points, log access by user/client devices through the access points, and generally centralize all aspects of wireless and mobile device management across the access points. Examples of protocols and services that may be used to provide such centralized management include, for example, Telnet, Secure Shell (SSH), Simple Network Management Protocol (SNMP), and Hypertext Transfer Protocol/JavaScript Object Notation (HTTP/JSON).

The wireless controller 202 is coupled to the Internet 204. As would be understood by one of skill in the art in possession of the present disclosure, the coupling of the wireless controller 202 to the Internet 204 may provide the cloud-based wireless flow manager discussed above. The Internet 204 may be coupled to one or more Layer 2/Layer 3 (L2/L3) networks 206 that, as discussed below, may be in different geographic locations in some embodiments. The one or more L2/L3 networks 206 may be coupled to an access point 208 (e.g., a first L2/L3 network may be coupled to the access point 208). The access point 208 may be the IHS 100 discussed above with reference to FIG. 1 and/or may include some or all of the components of the IHS 100. The access point 208 includes a flow agent 208a and a wireless management agent 208b. While illustrated with only the flow agent 208a and the wireless management agent 208b, one of skill in the art will recognize that the access point 208 may include a variety of other components such as, for example, a communication system, a processing system, a memory system including instructions that when executed by the processing system cause the processing system to provide the functionality discussed below for the flow agent 208a, the wireless management agent 208b, and/or other components of the access point 208, a database, and/or a variety of other access point subsystems known in the art.

The one or more L2/L3 networks 206 may also be coupled to an access point 210 (e.g., the first L2/L3 network that is coupled to the access point 208 may be coupled to the access point 208, a second L2/L3 network may be coupled to the access point 210 that is different than the first L2/L3 network and in some embodiments located in a different geographic location than the first L2/L3 network, etc.). The access point 210 may be the IHS 100 discussed above with reference to FIG. 1 and/or may include some or all of the components of the IHS 100. The access point includes a flow agent 210a and a wireless management agent 210b. While illustrated with only the flow agent 210a and the wireless management agent 210b, one of skill in the art will recognize that the access point 210 may include a variety of other components such as, for example, a communication system, a processing system, a memory system including instructions that when executed by the processing system cause the processing system to provide the functionality discussed below for the flow agent 210a, the wireless management agent 210b, and/or other components of the access point 210, a database, and/or a variety of other access point subsystems known in the art. While only two access points are illustrated as coupled to the L2/L3 networks 206, one of skill in the art in possession of the present will recognize that any number of access points may be coupled to any number of L2/L3 networks that coupled through the Internet 204 to the wireless controller 202 while remaining within the scope of the present disclosure.

A plurality of user devices 212 (also referred to as "client devices" herein) are illustrated as coupled to the access point 208 to provide an embodiment of user devices connected wirelessly to the access point 208. While not illustrated, user devices/client devices may be connected to the access point 210 and managed in substantially the same manner as discussed above for the user devices 212 and the access point 208. Any or all of the user devices 212 may be the IHS 100 discussed above with reference to FIG. 1 and/or may include some or all of the components of the IHS 100. The user devices 212 may be any device with wireless connectivity functionality such as, for example, a notebook/laptop computer, a tablet computer, a mobile phone, a music player device, a watch, a fitness computer, a home appliance, an automobile, and/or a wide variety of other wireless devices known in the art.

Figure 3:
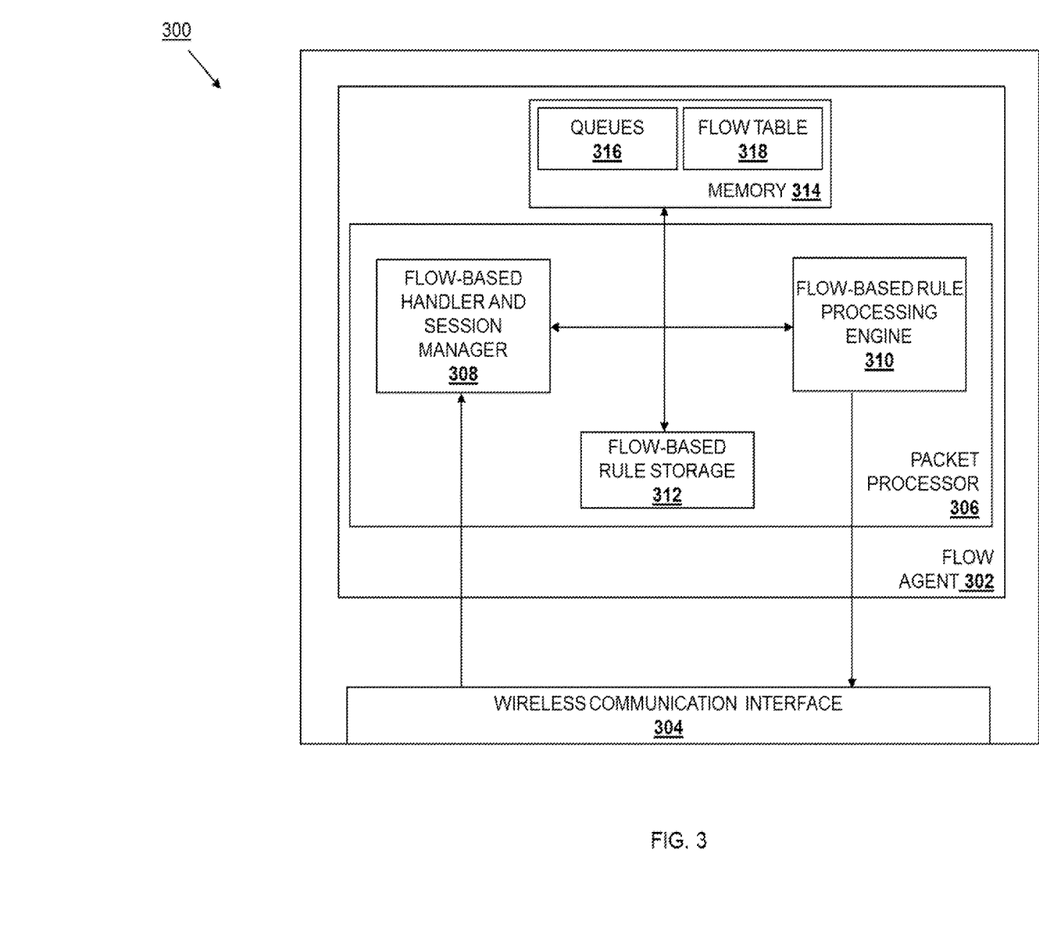
FIG. 3 is a schematic view illustrating an embodiment of an access point in the centralized network management system of FIG. 2.

Referring now to FIG. 3, an embodiment of an access point 300 is illustrated that may be the access points 208 and/or 210 discussed above with reference to FIG. 2. The access point 300 illustrated in FIG. 3 includes a flow agent 302 that may be the flow agent 208a discussed above with reference to FIG. 2, while the wireless management agent 208b of FIG. 2 has been omitted for clarity of illustration and discussion. The flow agent 302 is coupled to a wireless communication interface 304 that may include, for example, a Media Interface with physical (PHY) and link (MAC) layers. The wireless communication interface 304 is coupled to a packet processor 306 which, in an embodiment, may be a flow-based packet processing chip such as, for example, a chip that has been optimized to inspect and classify application layer packet information (as opposed to convention packet processing chips that process packets based on layer-2 and layer-3 data), as discussed further below. The packet processor 306 includes a flow-based handler and session manager 308, a flow-based rule processing engine 310, and a flow-based rule storage 312. Each of the flow-based handler and session manager 308 and the flow-based rule processing engine 310 are coupled to the wireless communication interface 304. The flow-based handler and session manager 308, the flow-based rule processing engine 310, and the flow-based rule storage 312 are coupled to each other and to a memory 314. The flow-based rule storage 312 is configurable and programmable to include a variety of flow session rules, discussed in further detail below. Furthermore, the flow-based rule storage 312 may include one or more default rules that may be applied to packets that are not associated with any stored flow session rules, discussed in further detail below. In an embodiment, the memory 314 is external to the packet processor 306 and coupled to at least one core of the packet processor 306 through a high speed memory bus. The memory 314 includes a plurality of queues 316 and a flow table 318. The flow table 318 may include a plurality of flow match rules, discussed in further detail below. While not illustrated in detail, one of skill in the art will recognize that the flow agent 302 may include one or more non-transitory, computer-readable mediums that are coupled to the packet processor 306 and include instructions that, when executed by the packet processor 306, cause the packet processor 306 to provide the functions of the flow-based handler and session manager 308 and the flow-based rule processing engine 310, discussed in further detail below.

The access point 300 illustrated in FIG. 3 provides an example of a "fat", or relatively complex, access point that include the functionality discussed below the recognize wireless traffic associated with different flows and different flow session, and apply flow session rules to the wireless traffic based upon the flow session to which they belong. However, one of skill in the art will recognize how the flow agent 208a/302 and flow controller 202a may operate together to allow a "thin" access point to direct received wireless traffic according to flow session rules (e.g., by providing information about received wireless traffic to the flow controller 202a and receiving back instructions on how to deal with the received wireless traffic). Thus, the description of the functionality of the flow agent 208a/302 below should not be interpreted as limited to being provided in an access point in the centralized wireless network management system 200.

Figure 4:
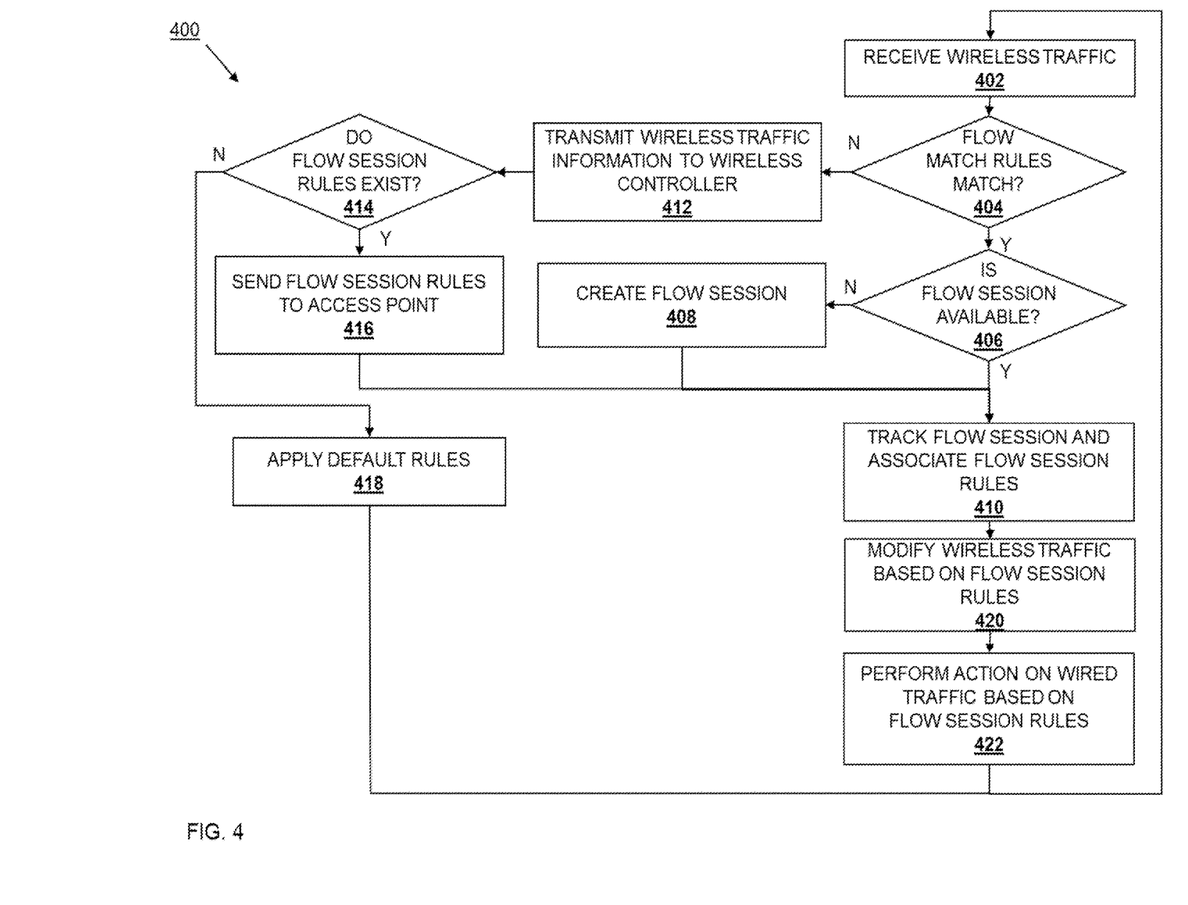
FIG. 4 is a flow chart illustrating an embodiment of a method for managing a wireless network.

Referring now to FIGS. 2, 3, and 4, an embodiment of a method 400 for managing a wireless network is illustrated. The method 400 is described as being performed by the flow agent 300 illustrated in FIG. 3, as implemented in the centralized network management system 200 of FIG. 2 (e.g., via communication between the wireless controller 202 and the access points 208 and/or 210), but as discussed above, may be performed in a variety of other wireless management scenarios known in the art that include less complex access points. The method 400 is discussed below as being performed by the flow agent 208a/300 in the access point 208, but may be applied equally to the access point 210 and/or other access points included in the centralized network management system 200. The method 400 and flow-based architecture illustrated in FIG. 2 may be leveraged for access network designs, aggregation network designs, and a variety of other network designs known in the art. The flow based processing performed in the method 400 addresses next-generation network architectures that requires intensive and high performance packet processing of content aware applications and services at line rate speeds, while providing programmable deep packet inspection and classification of complex data types of flow-based services designed into emerging technologies (e.g., the OpenFlow protocol, L4-L7 protocols, security and filtering, traffic management, load balancing, rate shaping, and/or a variety of other emerging technologies known in the art.)

Prior to the beginning of method 400, the wireless controller 202 and the access point 208 are coupled to the Internet 204 and the L2/L3 network 206. Upon being coupled to the L2/L3 network 206, the wireless management agent 208b in the access point 208 may operate to discover the wireless controller 202 through the L2/L3 network 206 and the Internet 204 (e.g., via communication with the wireless manager 202b in the wireless controller 202) using methods known in the art. Upon discovery, the wireless management agent 208b in the access point 208 operates to register with the wireless controller 202 through the L2/L3 network 206 and the Internet 204 (e.g., via communication with the wireless manager 202b in the wireless controller 202) using methods known in the art. Upon registration of the access point 208 with the wireless controller 202b, the flow controller 202a may operate to retrieve one or more flow match rules and associated flow session rules, discussed in further detail below, that are stored in the database 202c. The controller 202a may then provide those flow match rules and associated flow session rules over the Internet 204 and the L2/L3 network 206 to the flow agent 208a in the access point 208, and the flow agent 208a may operate to store those flow match rules and flow session rules in a storage device (e.g., in the flow table 318 and flow-based rule storage 312, respectively, discussed above).

Flow match rules and flow session rules may be provided by a network administrator or other authorized user of the centralized network management system 200 based on desired characteristics of the centralized network management system 200. In an embodiment, flow match rules may be any data that describes a flow session and that may be compared to metadata in a packet included in received wireless traffic in order to determine whether that packet is part of a flow session for which a corresponding set of flow session rules should be applied. Examples of flow match rules may include rules that determine matches of Media Access Control (MAC) addresses, Virtual Local Area Networks (VLANs), Internet Protocol (IP) addresses, port numbers, application signatures, Universal Resource Locators (URLs), combinations thereof, and/or a variety of other match rule qualifiers known in the art.

In an embodiment, flow session rules may include a modification rule such as, for example, a rule to modify a packet belonging to a flow session based on any user requirement. For example, a modification to a packet belonging to a flow session may include adding or modifying a VLAN identifier in the packet. In another example, a modification to a packet belonging to a flow session may include adding or modifying an Internet Protocol (IP) address in the packet. In another example, a modification to a packet belonging to a flow session may include changing a packet priority of the packet. In another embodiment, flow session rules may include device or user based rules. For example, a packet belonging to a flow session may be subject to a device based rule that subjects packets of that flow session to a data delivery level that depends on the type of device. In another example, a packet belonging to a flow session may be subject to a user based rule that subjects packets of that flow session to a data delivery level that depends on the user that started that flow session.

In an embodiment, flow session rules may include a security rule such as, for example, a rule for dropping packets belonging to a flow session that is accessing unauthorized websites. In an embodiment, flow session rules may include a load balancing rule such as, for example, a rule for directing packets in a flow session to a destination based on a network traffic design. In an embodiment, flow session rules may include a traffic shaping rule such as, for example, a rule for directing packets belonging to a flow session to maintain traffic speeds over one or more traffic interfaces. In an embodiment, flow session rules may include a statistical rule such as, for example, a rule to direct packets in a flow session to maintain traffic statistics as desired. In an embodiment, flow session rules may include a packet header rewrite rule such as, for example, a rule to rewrite the destination of packets in a flow session as desired by the user. In an embodiment, flow session rules may include a redirection rule such as, for example, a rule for directing packets in a flow session to another network, application, etc. For example, a redirection of a packet belonging to a flow session may include redirecting packets belonging to an authentication flow to an authentication system. While several specific flow session rules have been described, one of skill in the art in possession of the present disclosure will recognize that a wide variety of flow session rules will fall within the scope of the present disclosure.

The method 400 begins at block 402 where wireless traffic is received. For example, any of the user devices 212 may wirelessly communicate with the access point 208 using methods known in the art. For example, a user device 212 may wirelessly send packets to the access point 208/300, and those packets may be received at the communication interface 304 and provided to the flow agent 302 for assembly. As such, packets may be sent from one or more of the user devices 212 to the access point 208 (e.g., a first user device 212 may wirelessly send a first set of packets to the access point 208, a second user device 212 may wirelessly send a second set of packets to the access point 208, and so on.) Packet data passes through the communication interface 304 and to the flow-based handler and session manager 308 in the packet processor 308. The flow-based handler and session manager 308 receives the packet data and assembles the packet data into packets for further processing. Thus, the flow-based handler and session manager 308 may receive a first set of packet data and assemble a first packet from that packet data, receive a second set of packet data and assemble a second packet from that packet data, receive a third set of packet data and assemble a third packet from that packet data, and so on. As packets are assembled, they may be stored in the queues 316 of the memory 314 before or while being processed according to the method 400.

The method 400 then proceeds to decision block 404 where it is determined whether the packet includes metadata that matches flow match rules (e.g., the flow match rules received from the wireless controller 202 and stored by the flow agent 208a/302 in the flow table 318 of the memory 314 in the access point 208/300 prior to the method 400, as discussed above). Subsequent to assembling a packet in block 402 of the method 400, the flow-based handler and session manager 308 may perform a deep inspection on the packet header. For example, the flow-based handler and session manager 308 may inspect the packet header for layer 4 (transport layer) metadata (e.g., TCP, UDP, SCTP, DCCP, and/or SPX data), layer 5 (session layer) metadata (e.g., Named pipe, NetBIOS, SAP, PPTP, and/or SOCKS data), layer 6 (presentation layer) metadata (e.g., MIME, XDR, TLS, and/or SSL data), and/or layer 7 (application layer) metadata (e.g., NNTP, SIP SSI, DNS, FTP, Gopher, HTTP, NFS, NTP, SMPP, SMTP, SNMP, Telnet, DHCP, Netconf, RTP, SPDY, and/or other application layer metadata known in the art). In one example, an application may use Session Initiation Protocol (SIP) to communicate with other entities in the network, and at decision block 404, the flow-based handler and session manager 308 will retrieve SIP application layer data from the packet header. Using the metadata from the deep inspection of the packet, the flow-based handler and session manager 308 then compares that metadata to flow match rules that are stored in the flow table 318 to determine whether the packet assembled in block 402 of the method 400 belongs to a flow that is associated with one or more of the flow match rules that are stored in the flow table 318. The flow-based handler and session manager 308 may employ a variety of algorithms to determine whether the metadata from the packet is belongs to a flow such as, for example, retrieving application layer metadata such as signatures (e.g., URLs) from the packet header and matching that application layer metadata with flow match rule data for a flow in the flow table 318. As discussed in further detail below, when the first packet associated with a particular flow is received for which no flow match rules and flow session rules are available in the access point 208, the flow-based handler and session manager 308 may retrieve flow match rules and/or flow session rules that pertain to configurations and management associated with the flow to which that packet belongs, store those flow match rules in the flow table 318, store the associated flow session rules in the flow-based rule storage 312, and create a flow session. Then, further packets associated with that particular flow session can then be determined to be part of that flow session by matching metadata retrieved through the deep packet inspection discussed above with the flow match rules data in the flow table 318.

In an embodiment of decision block 404, using the metadata retrieved through the deep packet inspection discussed above, the flow-based handler and session manager 308 may access the flow table 318 to determine whether any flow match rules exist for that packet. In one example, the flow agent 208a/302 may have retrieved a flow session rule, discussed in further detail below, for modifying wireless traffic belonging to a flow (e.g., the flow session rule may cause modification of a VLAN identifier in a packet belonging to an authentication flow). When a packet is received and the deep packet inspection retrieves application layer metadata that includes a signature related to a authentication, the flow-based handler and session manager 308 will determine that signature matches a flow match rule in the flow table 318. In another example, the flow agent 208a/302 may have retrieved a flow session rule, discussed in further detail below, for video conferencing (e.g., the flow session rule may cause the packet to be redirected to a link provided for video conferencing traffic). When a packet is received and the deep packet inspection retrieves application layer metadata that includes a signature related to a video conferencing application, the flow-based handler and session manager 308 will determine that signature matches a flow match rule in the flow table 318. A user of the centralized network management system 200 may pre-configure and program flow session rules for packets in the database 202c of the wireless controller 202, and the flow agent 208/302 may communicate with the flow controller 202a to retrieve those flow session rules and store them in the flow-based rule storage 312 for particular flows, while retrieving flow match rules associated with those particular flows and storing them in the flow table 320.

If, at decision block 404, the flow-based handler and session manager 310 determines that flow match rules match the packet metadata, the method 400 then proceeds to decision block 406 where the flow-based handler and session manager 308 determines whether a flow session is available for the packet. If a flow session is not available, the method proceeds to block 408 where a flow session is created. In an embodiment, the flow-based handler and session manager 310 creates a new flow session for the flow that is associated with the packet that matched the flow match rules at decision block 404 but for which no flow session was found to exist at decision block 406. In an embodiment, the creation of a new flow session includes the generation and storage of a new flow session identification (e.g., in the flow table 318 or other storage.) In an embodiment, the flow-based handler and session manager 308 creates the flow session in the flow table 318 in the memory 314 that corresponds to associated flow match rules and flow session rules sets to provide flow session data that is associated with the new flow session (e.g., in the flow table 318.) Thus, in some embodiments, a first flow session may be created in response to receiving a packet that includes metadata that matches any flow match rules in the flow table 318 but for which no flow session currently exists, and that first flow session may be used to track all subsequent packets that include metadata that indicates that they are part of the same flow. Furthermore, a second flow session may be created in response to receiving a packet that includes metadata that matches any flow match rules in the flow table 318 but for which no flow session currently exists, and that second flow session may be used for subsequent packets that include metadata that indicates that they are part of the same flow. One of skill in the art will recognize that any number of flow sessions may be created as packets associated with different flows are received by the flow-based handler and session manager 308. If, at decision block 406, the flow-based handler and session manager 310 determines that a flow session is available for the packet (e.g., as previously created in block 408 during a previous invocation of the method 400), the method 400 proceeds to block 410, discussed in further detail below.

If, at decision block 404, the flow-based handler and session manager 310 determines that the packet does not include metadata that matches flow match rules in the flow table 318, the method 400 proceeds to block 412 where wireless traffic information is transmitted to the wireless controller. In an embodiment of block 412, the flow agent 208a/302 may transmit information about the wireless traffic, which was received at block 402 and determined to not include metadata that matched any flow match rules, to the flow controller 202a in the wireless controller 202. Information about the wireless traffic transmitted to the wireless controller at block 412 may include any information identifying that wireless traffic such as, for example, a radio frequency (RF) device identifier, a MAC address of a wireless device, an application signature, and/or a variety of other identifying information for known in the art. At block 412 the wireless manager 202b may first authenticate the wireless traffic using authentication methods known in the art. The method 400 then proceeds to decision block 414 where it is determined whether flow session rules exist for the wireless traffic identified by the information transmitted at block 412. In an embodiment of decision block 414, the flow controller 202a accesses the database 202 to determine whether any flow session rules are stored in the database 202c for the wireless traffic that was received by the access point 208 at block 402 and determined not to not include metadata that matched any flow match rules. If flow session rules are determined to exist at decision block 414, the method 400 proceeds to block 416 where those flow session rules, along with associated flow match rules, are sent the access point 208/302. In an embodiment of block 416, the flow controller 202a in the wireless controller 202 retrieves the flow match rules and flow session rules from the database 202c and sends them through the Internet 204 and L2/L3 network 206 to the access point 208, and the flow agent 208a receives the flow match rules and flow session rules and stores them in the flow table 318 and flow-based rules storage 312, respectively. The method 400 then proceeds to block 410, discussed in further detail below If flow session rules are determined to not exist at decision block 414, the method 400 proceeds to block 418 where default rules may be applied. In an embodiment of block 418, the flow controller 202 may inform the flow agent 208a/302 that no flow session rules exist for the wireless traffic that was received by the access point 208 at block 402 and determined not to not include metadata that matched any flow match rules at decision block 404, and the flow-based handler and session manager 308 may retrieve and apply one or more default rules from a storage and apply the one or more default rules to the packet. In an embodiment, default rules may be applied to simply forward packets, to apply more complex modification and forwarding logic to the packets, to drop the packets, to restrict traffic including those packets, etc.

Following either decision block 406, block 408, or block 416, the method 400 proceeds to block 410 where the flow session is tracked and flow session rules are associated with the packet. Once the flow session is created at block 408, the flow-based handler and session manager 308 may match assembled packets to flow sessions as discussed above with reference to decision blocks 404 and 406. Furthermore, the flow-based handler and session manager 308 may monitor and maintain all active and open flow sessions. The flow-based handler and session manager 308 will continue to match packets to flow sessions until a flow session stop indicator is received. For example, when a flow has finished, the final packet associated with that flow may include a flow session stop indicator that indicates that that flow has ended and causes the flow-based handler and session manager 308 to deactivate the associated flow session in the flow table 318 in the memory 314. In one example, flow session termination may be detected using application layer metadata (e.g. SIP application layer metadata), transport layer metadata (TCP or UDP transport layer transport layer data), link layer metadata (e.g., in the absence of data being received for a predetermined amount of time), etc. Furthermore, at block 410, for packets associated with active flow sessions, the flow-based handler and session manager 308 uses the metadata retrieved through the deep packet inspection discussed above to retrieve one or more flow session rules from the flow-based rule storage 312 and associates the one or more flow-based rules with the packet. For example, using the example including the user-created rule for modifying packets associated with an authentication flow discussed above, the user-created rule may provide for modifying a VLAN identifier in the packet. In another example, using the example including the user-created rule for video conferencing discussed above, the user-created rule that provides for the redirection of the packet to a link provided for video conferencing is associated with the packet. Flow-based rules associated with a packet may be provided to the flow-based rule processing engine 310 at block 410.

The method 400 then proceeds to block 420 where the wireless traffic may be modified using the flow session rules. In an embodiment, the flow-based rule processing engine 310 uses the flow session rules associated with the packet in block 410 to modify the packet. For example, the packet may be modified according to the rules described above by changing any information in the packet header or elsewhere based on the requirements of the flow session rule. As discussed above, modification of the wireless traffic belong to a flow session using a flow session rule may include modifying a packet belonging to that flow session by adding or modifying a VLAN identifier in the packet, adding or modifying an IP address in the packet, changing a packet priority of the packet, and/or performing a variety of other modifications known in the art. Modification of the wireless traffic received at block 420 produces modified wireless traffic following block 420.

Following block 420, the method 400 proceeds to block 422 where an action is performed on the modified wired traffic using the flow session rules. In an embodiment, the flow-based rule processing engine 310 uses the flow session rules associated with the packet in block 410 to perform an action the modified wireless traffic according to the flow session rules. For example, actions performed on the modified wired traffic may include forwarding a packet belonging to a flow session based on associated flow session rules, dropping a packet belonging to a flow session based on associated flow session rules, authenticating a packet belonging to a flow session based on associated flow session rules, and/or a variety of other actions known in the art. In another embodiment, flow session rules may include device or user based rules.

In a specific example, packets of a particular flow session may be subject to a data delivery level that depends on the type of device that sent the packet. In another specific example, packets of a particular flow session may be subject to a data delivery level that depends on the user that started that flow session. In another specific example, packets of a particular flow session may be dropped if the flow session includes accessing unauthorized websites. In another specific example, packets of a particular flow session may be directing to a destination based on a network traffic design. In another specific example, packets of a particular flow session may be directing to maintain traffic speeds over one or more traffic interfaces. In another specific example, packets of a particular flow session may be directed to maintain traffic statistics as desired. In another specific example, the destination of packets of a particular flow session may be rewritten as desired by the administrator user. In another specific example, packets of a particular flow session may be directing to another network, application, etc. (e.g., packets belonging to an authentication flow may be redirected to an authentication system for further processing), and actions may be performed on those packets by the processing unit to which they are sent.

The method 400 then returns to block 402 to where wireless traffic is received, packets are assembled, and the flow-based packet processing is repeated. One of skill in the art will recognize that the method 400 may be used by the centralized wireless network management system to process, in parallel, sets of packets associated with different flow sessions. For example, a first set of packets associated with a first flow may be received and assembled, with a first flow session created upon receiving the first packet in the first set of packets, followed by modification of the packets in the first set of packets using the flow-based rules as discussed above before performing the action on the packets in the first set of packets using the flow-based rules. Concurrently, a second set of packets associated with a second flow may be received and assembled, with a second flow session created upon receiving the first packet in the second set of packets, followed by modification of the packets in the second set of packets using the flow-based rules as discussed above before performing the action on the packets in the second set of packets using the flow-based rules. This may occur for any number of flows occurring within the network.

Figure 5:
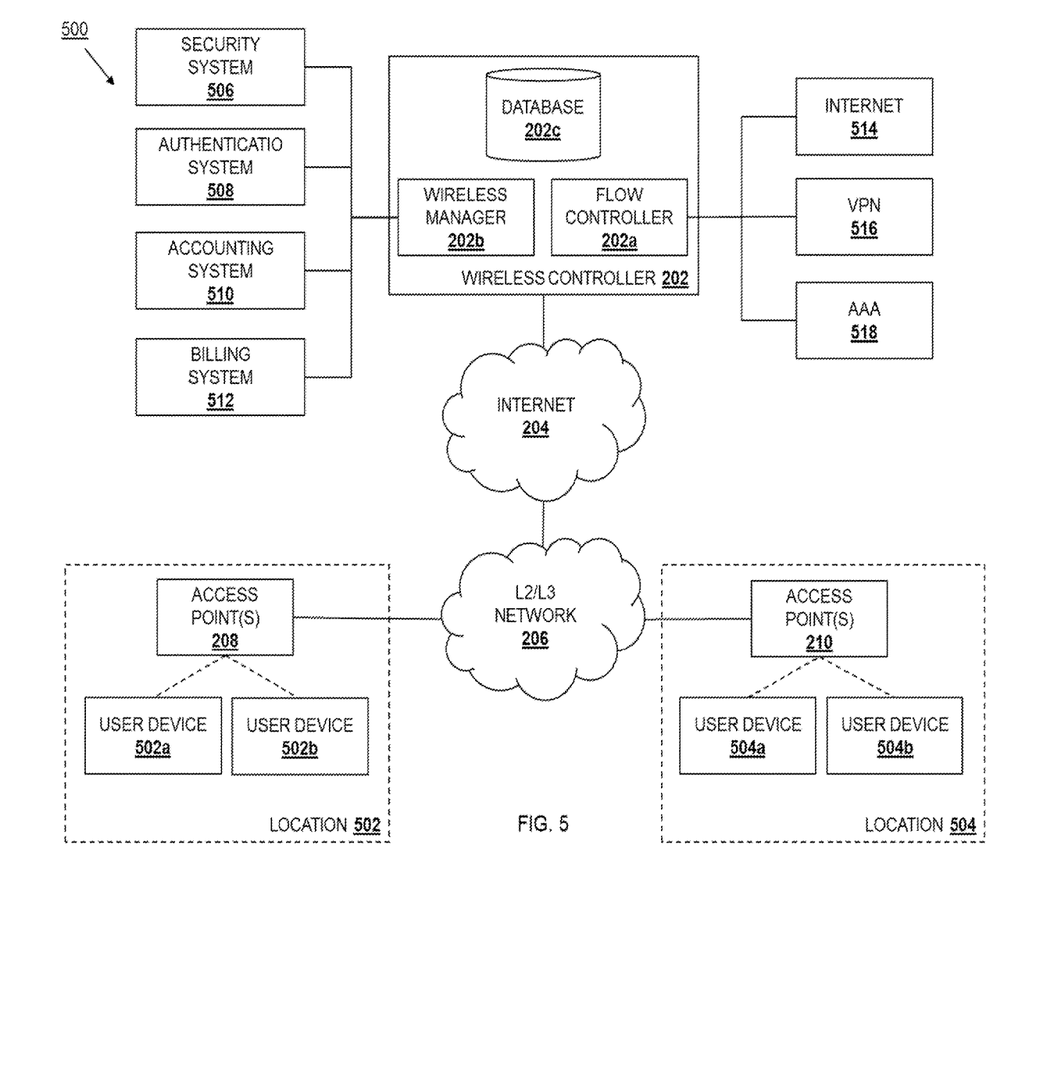
FIG. 5 is a schematic view illustrating an embodiment of the operation of the centralized wireless network management system of FIG. 2.

Referring now to FIG. 5, an embodiment of the operation 500 of the centralized network management system 200 of FIG. 2 is illustrated. Elements of the centralized network management system 200 illustrated in FIG. 2 are given the same reference numbers in FIG. 5 for ease of understanding. In the operation 500 illustrated in FIG. 5, access points 208 are located in a first location 502 and provide wireless access to user devices 502a and 502b, while access points 210 are located in a second location 504 that is different than the first location 502 (i.e., different geographic locations including different buildings, different cities, different states, different countries, etc.) and provide wireless access to user devices 504a and 504b. During operation, the access points 208 and 210 may operate according to the method 400 discussed above to receive wireless traffic from the user devices 502a, 502b, 504a, and 504b, modify that wireless traffic using flow session rules to provide modified wireless traffic, translate that modified wireless traffic to provide modified wired traffic, and perform actions on that modified wired traffic according to the flow session rules. As such, wireless traffic associated with a particular flow (e.g., a security flow, an authentication flow, a payment flow, etc.) may be forwarded to the flow controller 202a, through the wireless manager 202b, and to a security system 506, an authentication system 508, an accounting system 510, and a billing system 512. Similarly, wireless traffic associated with an Internet flow may be forwarded to the flow controller 202a and on to the Internet 514, wireless traffic associated with Virtual Private Network (VPN) flow may be forwarded to the flow controller 202a and on to a VPN 516, and wireless traffic associated with Authentication, Access, and Accounting (AAA) flow may be forwarded to the flow controller 202a and on to a AAA 516. Furthermore, while FIG. 5 illustrates the access points 208 and 210 forwarding wired traffic through the wireless controller 202, one of skill in the art in possession of the present disclosure will recognize that the access points 208 and 210 may forward the wired traffic without that wired traffic being forwarded through the wireless controller 202 or involving the flow controller 202a and/or wireless manager 202b.

In an embodiment, the wireless management agent 208b in the access point 208 may operate to report information about received wireless traffic to the wireless manager 202b in the wireless controller 202. For example, any information about the received wireless traffic may be included in such a report, including identifying information about the wireless traffic, metadata in the wireless traffic that matched a flow match rule, a identifying information about a flow session to which the wireless traffic belonged, flow session rules applied to modify or perform an action on the wireless traffic, default rules applied to the wireless traffic, and/or a variety of other information known in the art. Reports of received wireless traffic provided by the access point 208 to the wireless controller 202 may be stored in the database 202c and used to collect information about wireless traffic belonging to flow sessions. Such reporting allows, for example, for the logging each user device communicating with each access point in the centralized network management system 200. Using the wireless controller 202 in such a manner provides a single centralized management system having complete knowledge of mobile and wireless devices operating across different physical/geographic locations (e.g., the locations 502 and 504) and different networks (e.g., different L2/L3 networks 206). The ability to manage access points centrally across a variety of different geographic locations with knowledge of any user devices that connects to any of those access points allows for the centralized application of regional restrictions of content and/or application access through access points in different regions (i.e., different geographic locations including different buildings, different cities, different states, different countries, etc.), access to one or more networks in different regions with only an automatic device login (e.g., a device login performed in the background of a user device), and/or a variety of other multi-location benefits that would be realized by one of skill in the art in possession of the present disclosure.

One of the many benefits provided by the centralized network management system 200 is that, unlike traditional packet processing where multiple read/write operations are required for packet processing and forwarding, the flow agent 302 optimizes management and operation of the memory 314 by needing only a single write operation of a flow to the memory 314, and as flows are scheduled for forwarding and redirection, only a single read operation is needed from the queues 316. Conventional systems require multiple reads and writes to classify, process, and forward a packet. The system of the present disclosure receives a packet and performs one write of the packet into the queue after classification, when the packet is scheduled to egress the access point 208/300, one read is performed by the rule processing engine, followed by applying the rule to the packet and sending the packet to the destination.

Thus, a centralized network management system and method have been described that provide many advantages over conventional network management systems known in the art. For example, the centralized network management system and method of the present disclosure provide for application level flow-based inspection and classification capability, real-time flexible and programmable forwarding design, finer flow level control and traffic management (e.g., load balancing and rate shaping), flexible packet manipulation and modification logic to accommodate complex data types and new flow-based and application aware services/technologies, and an effective and efficient, less complex and more scalable wireless management system that spans multiple geographical and/or enterprise boundaries. Advantages such as enhanced security, enhanced mobility of user devices, the ability to provide a comprehensive flow management view of access points, and the ability to handle and take action on all wireless flows without the need to send traffic back to a central network location for processing will be realized by one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A wireless centralized network management system, comprising:
a network;
a wireless controller system that is coupled to the network; and
a plurality of access points that are coupled to the network, wherein each of the plurality of access points are configured to:
receive first wireless traffic that includes a packet from a first user device;
determine that no first flow session rules are available for the first wireless traffic that is part of a first flow session;
transmit first wireless traffic information that identifies the first wireless traffic without transmitting the entire packet to the wireless controller system and, in response, receive and store at least one first flow session rule for the first flow session that includes the first wireless traffic;
modify the first wireless traffic according to the at least one first flow session rule that was received from the wireless controller system and that is associated with the first flow session to provide modified first wireless traffic;
translate the modified first wireless traffic to modified first wired traffic; and
perform an action on the modified first wired traffic according to the at least one first flow session rule.

2. The system of claim 1, wherein each of the plurality of access points are configured to:
receive second wireless traffic from a second user device;
determine that at least one second flow session rule is available for the second wireless traffic that is part of a second flow session;
modify the second wireless traffic according to the at least one second flow session rule to provide modified second wireless traffic;
translate the modified second wireless traffic to modified second wired traffic; and
perform an action on the modified second wired traffic according to the at least one second flow session rule.

3. The system of claim 2, wherein each of the plurality of access points are configured to:
receive third wireless traffic from the second user device;
determine that the at least one second flow session rule is available for the third wireless traffic that is part of the second flow session;

modify the third wireless traffic according to the at least one second flow session rule to provide modified third wireless traffic;

translate the modified third wireless traffic to modified third wired traffic; and perform an action on the modified third wired traffic according to the at least one second flow session rule.

4. The system of claim 1, wherein each of the plurality of access points are configured to:

discover the wireless controller system through the network;

register with the wireless controller system; and receive and store the at least one first flow session rule.

5. The system of claim 1, wherein the modifying the first wireless traffic using at least one first flow session rule includes at least one of modifying a Virtual Local Area Network (VLAN) identifier of the first wireless traffic, modifying an Internet Protocol (IP) address of the first wireless traffic, and changing a priority of the first wireless traffic.

6. The system of claim 1, wherein each of the plurality of access points are configured to:

provide a report of the first wireless traffic to the wireless controller system.

7. The system of claim 6, wherein the wireless controller system is configured to log each user device communicating with each of the plurality of access points using reports received from the plurality of access points.

8. An information handling system (IHS), comprising:

a processing system;

a memory system that stores at least one first flow session rule that is associated with a first flow session, and that includes instructions that, when executed by the processing system, cause the processing system to provide an access point that is configured to:

receive first wireless traffic that includes a packet from a first user device;

determine that no first flow session rules are available for the first wireless traffic that is part of the first flow session;

transmit, through a network, first wireless traffic information that identifies the first wireless traffic without transmitting the entire packet to a wireless controller system and, in response, receive and store at least one first flow session rule for the first flow session that includes the first wireless traffic;

modify the first wireless traffic according to the at least one first flow session rule to provide modified first wireless traffic;

translate the modified first wireless traffic to modified first wired traffic; and perform an action on the modified first wired traffic according to the at least one first flow session rule.

9. The IHS of claim 8, wherein the access point is configured to:

receive second wireless traffic from a second user device;

determine that at least one second flow session rule is available for the second wireless traffic that is part of a second flow session;

modify the second wireless traffic according to the at least one second flow session rule to provide modified second wireless traffic;

translate the modified second wireless traffic to modified second wired traffic; and perform an action on the modified second wired traffic according to the at least one second flow session rule.

10. The IHS of claim 9, wherein the access point is configured to:

receive third wireless traffic from the second user device;

determine that the at least one second flow session rule is available for the third wireless traffic that is part of the second flow session;

modify the third wireless traffic according to the at least one second flow session rule to provide modified third wireless traffic;

translate the modified third wireless traffic to modified third wired traffic; and perform an action on the modified third wired traffic according to the at least one second flow session rule.

11. The IHS of claim 8, wherein the access point is configured to:

discover the wireless controller system through the network;

register with the wireless controller system;

receive the at least one first flow session rule; and store the at least one first flow session rule in the memory system.

12. The IHS of claim 8, wherein the modifying the first wireless traffic using at least one first flow session rule includes at least one of modifying a Virtual Local Area Network (VLAN) identifier of the first wireless traffic, modifying an Internet Protocol (IP) address of the first wireless traffic, and changing a priority of the first wireless traffic.

13. The IHS of claim 8, wherein the access point is configured to:

provide a report of the first wireless traffic to the wireless controller system over the network.

14. A method for managing a wireless network, comprising:

receiving, by an access point, first wireless traffic that includes a packet from a first user device;

determining, by the access point, that no first flow session rules are available for the first wireless traffic that is part of a first flow session;

transmitting, by the access point through a network, first wireless traffic information that identifies the first wireless traffic to a wireless controller system and, in response, receiving at least one first flow session rule through the network from the wireless controller system for a first flow session that includes the first wireless traffic;

modifying, by the access point, the first wireless traffic according to the at least one first flow session rule to provide modified first wireless traffic;

translating, by the access point, the modified first wireless traffic to modified first wired traffic; and performing, by the access point, an action on the modified first wired traffic according to the at least one first flow session rule.

15. The method of claim 14, further comprising:

receiving, by the access point, second wireless traffic from a second user device;

determining, by the access point, that at least one second flow session rule is available for the second wireless traffic that is part of a second flow session;

modifying, by the access point, the second wireless traffic according to the at least one second flow session rule to provide modified second wireless traffic;

translating, by the access point, the modified second wireless traffic to modified second wired traffic; and performing, by the access point, an action on the modified second wired traffic according to the at least one second flow session rule.

16. The method of claim 15, further comprising:
receiving, by the access point, third wireless traffic from the second user device;
determining, by the access point, that the at least one second flow session rule is available for the third wireless traffic that is part of the second flow session;
modifying, by the access point, the third wireless traffic according to the at least one second flow session rule to provide modified third wireless traffic;
translating, by the access point, the modified third wireless traffic to modified third wired traffic; and
performing, by the access point, an action on the modified third wired traffic according to the at least one second flow session rule.

17. The method of claim 14, further comprising:
discovering, by the access point, the wireless controller system through the network;
registering, by the access point, with the wireless controller system; and
receiving and storing, by the access point, the at least one first flow session rule.

18. The method of claim 14, wherein the modifying the first wireless traffic using at least one first flow session rule includes at least one of modifying a Virtual Local Area Network (VLAN) identifier of the first wireless traffic, modifying an Internet Protocol (IP) address of the first wireless traffic, and changing a priority of the first wireless traffic.

19. The method of claim 14, further comprising:
providing, by the access point over the network, a report of the first wireless traffic to the wireless controller system.

20. The method of claim 19, further comprising:
logging, by the wireless controller system, each user device communicating with the access point using reports received from the access point.

* * * * *